US012288642B2

(12) United States Patent
Ji et al.

(10) Patent No.: US 12,288,642 B2
(45) Date of Patent: Apr. 29, 2025

(54) FABRICATION METHOD FOR AN INDUCTOR WITH A VERTICAL VINDING AND INJECTION MOLDING TOOLING THEREOF

(71) Applicant: Delta Electronics (Shanghai) Co., Ltd., Shanghai (CN)

(72) Inventors: Pengkai Ji, Shanghai (CN); Shouyu Hong, Shanghai (CN); Jinping Zhou, Shanghai (CN); Min Zhou, Shanghai (CN); Jianhong Zeng, Shanghai (CN); Zhenqing Zhao, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 1066 days.

(21) Appl. No.: 16/735,657

(22) Filed: Jan. 6, 2020

(65) Prior Publication Data

US 2020/0227205 A1 Jul. 16, 2020

(30) Foreign Application Priority Data

Jan. 7, 2019 (CN) ......................... 201910013476.1

(51) Int. Cl.
*H01F 41/02* (2006.01)
*H01F 1/24* (2006.01)
(Continued)

(52) U.S. Cl.
CPC ........... *H01F 41/0246* (2013.01); *H01F 1/24* (2013.01); *H01F 27/266* (2013.01); *H01F 41/04* (2013.01)

(58) Field of Classification Search
CPC ......... H01F 41/04–127; H01F 41/0246; H01F 2027/2814; H01F 2017/048; H01F 27/266; H05K 1/165; H05K 3/4685; H05K 3/4647
See application file for complete search history.

(56) References Cited

U.S. PATENT DOCUMENTS 4,384,321 A 5/1983 Rippel
5,111,278 A 5/1992 Eichelberger
(Continued)

FOREIGN PATENT DOCUMENTS

CN 1637969 A 7/2005
CN 101038880 A 9/2007
(Continued)

OTHER PUBLICATIONS

Corresponding China office action issued on May 24, 2021.
(Continued)

*Primary Examiner* — Livius R. Cazan
(74) *Attorney, Agent, or Firm* — CKC & Partners Co., LLC

(57) ABSTRACT

Disclosed are a method for fabricating an inductor with a vertical winding and an injection molding tooling thereof. The fabrication method includes: providing a conductive member that includes a connection piece, which includes a first surface and a second surface that are oppositely arranged, and a pillar on the first surface; injecting the magnetic material onto a side of the conductive member with the pillar, such that the magnetic material and the conductive member form an integrated structure; and cutting the connection piece to form the vertical winding. The injection molding tooling includes: an upper punch for stamping a magnetic material and a conductive member into an integrated structure, a molding cavity body surrounding a periphery of a pillar of the conductive member, and a lower punch for bearing a connection piece of the conductive member.

17 Claims, 24 Drawing Sheets

(51) Int. Cl.
*H01F 27/26* (2006.01)
*H01F 41/04* (2006.01)

(56) References Cited

U.S. PATENT DOCUMENTS

| | | | |
|---|---|---|---|
| 5,568,111 A | 10/1996 | Metsler | |
| 6,362,986 B1 | 3/2002 | Schultz et al. | |
| 6,627,984 B2 | 9/2003 | Bruce et al. | |
| 6,806,580 B2 | 10/2004 | Joshi et al. | |
| 7,173,333 B2 | 2/2007 | Hata et al. | |
| 7,199,695 B1 | 4/2007 | Zhou et al. | |
| 7,898,379 B1 | 3/2011 | Stratakos et al. | |
| 8,736,040 B2 | 5/2014 | Hauenstein et al. | |
| 10,186,950 B2 | 1/2019 | Wolf et al. | |
| 10,438,736 B2 | 10/2019 | Zhou et al. | |
| 10,819,227 B2 | 10/2020 | Zhou et al. | |
| 11,605,495 B2 | 3/2023 | Xiong et al. | |
| 2001/0007287 A1 | 7/2001 | Hoche | |
| 2001/0030595 A1* | 10/2001 | Hamatani | H01F 41/046 29/606 |
| 2004/0183645 A1* | 9/2004 | Takaya | H01F 41/041 336/234 |
| 2005/0161785 A1 | 7/2005 | Kawashima et al. | |
| 2006/0232942 A1 | 10/2006 | Nakatsu et al. | |
| 2008/0067990 A1 | 3/2008 | Wei | |
| 2008/0180077 A1 | 7/2008 | Qiu et al. | |
| 2008/0265858 A1 | 10/2008 | Muratov | |
| 2008/0315982 A1 | 12/2008 | Wei et al. | |
| 2010/0194511 A1 | 8/2010 | Kobayashi et al. | |
| 2011/0148560 A1 | 6/2011 | Ikriannikov | |
| 2012/0008286 A1 | 1/2012 | Suzuki | |
| 2012/0014059 A1 | 1/2012 | Zeng et al. | |
| 2012/0049994 A1 | 3/2012 | Joo et al. | |
| 2012/0161128 A1 | 6/2012 | Macheiner et al. | |
| 2013/0049137 A1 | 2/2013 | Uno et al. | |
| 2013/0094269 A1 | 4/2013 | Maeda et al. | |
| 2014/0266552 A1 | 9/2014 | Silva et al. | |
| 2015/0055306 A1 | 2/2015 | Burns et al. | |
| 2015/0200050 A1 | 7/2015 | Nakao et al. | |
| 2015/0235753 A1 | 8/2015 | Chatani et al. | |
| 2015/0235754 A1 | 8/2015 | Ikriannikov | |
| 2016/0020013 A1* | 1/2016 | Berdy | H01F 27/2804 336/200 |
| 2016/0196914 A1* | 7/2016 | Klesyk | H01F 27/24 336/192 |
| 2016/0284789 A1 | 9/2016 | Zuo et al. | |
| 2016/0300658 A1 | 10/2016 | Wu et al. | |
| 2016/0300659 A1 | 10/2016 | Zhang et al. | |
| 2016/0307690 A1 | 10/2016 | Madsen et al. | |
| 2017/0018348 A1 | 1/2017 | Mak et al. | |
| 2017/0062121 A1 | 3/2017 | Yang et al. | |
| 2017/0064808 A1 | 3/2017 | Rizza et al. | |
| 2017/0178794 A1 | 6/2017 | Yan et al. | |
| 2017/0250025 A1 | 8/2017 | Wei et al. | |
| 2017/0373133 A1 | 12/2017 | Liao | |
| 2018/0061560 A1 | 3/2018 | Wukovits et al. | |
| 2018/0096780 A1 | 4/2018 | Sekiguchi et al. | |
| 2018/0102349 A1 | 4/2018 | Cho | |
| 2018/0122562 A1 | 5/2018 | Ji et al. | |
| 2018/0130595 A1 | 5/2018 | Choi et al. | |
| 2018/0182945 A1 | 6/2018 | Shimabukuro | |
| 2018/0204666 A1 | 7/2018 | Zhou et al. | |
| 2018/0204741 A1 | 7/2018 | Chew et al. | |
| 2018/0323147 A1 | 11/2018 | Kirby | |
| 2018/0323702 A1 | 11/2018 | Zhou et al. | |
| 2018/0336986 A1 | 11/2018 | Xin et al. | |
| 2019/0052171 A1 | 2/2019 | Kitamoto | |
| 2019/0122814 A1 | 4/2019 | Hung | |
| 2019/0172629 A1 | 6/2019 | Zhou et al. | |
| 2019/0189334 A1 | 6/2019 | Miyashita et al. | |
| 2019/0214181 A1 | 7/2019 | Wang et al. | |
| 2019/0252114 A1 | 8/2019 | Lu et al. | |
| 2019/0385775 A1 | 12/2019 | Roth et al. | |
| 2020/0219647 A1 | 7/2020 | Ji et al. | |
| 2020/0219648 A1 | 7/2020 | Ji et al. | |
| 2021/0210472 A1 | 7/2021 | Ji et al. | |
| 2021/0350969 A1 | 11/2021 | Ji et al. | |
| 2022/0158558 A1 | 5/2022 | Ikriannikov et al. | |
| 2022/0158562 A1 | 5/2022 | Yang et al. | |
| 2022/0351898 A1 | 11/2022 | Wang et al. | |
| 2023/0085737 A1 | 3/2023 | Yang et al. | |

FOREIGN PATENT DOCUMENTS

| | | | | |
|---|---|---|---|---|
| CN | 101330075 A | 12/2008 | | |
| CN | 101378049 A | 3/2009 | | |
| CN | 101414602 A | 4/2009 | | |
| CN | 101483381 A | 7/2009 | | |
| CN | 101790766 A | 7/2010 | | |
| CN | 101840769 A | 9/2010 | | |
| CN | 201655476 U | 11/2010 | | |
| CN | 102314998 A | 1/2012 | | |
| CN | 102369790 A | 3/2012 | | |
| CN | 103081325 A | 5/2013 | | |
| CN | 103298258 A | 9/2013 | | |
| CN | 103383891 A | 11/2013 | | |
| CN | 103681535 A | 3/2014 | | |
| CN | 103887292 A | 6/2014 | | |
| CN | 204348470 U | 5/2015 | | |
| CN | 104756611 A | 7/2015 | | |
| CN | 105575943 A | 5/2016 | | |
| CN | 105679738 A | 6/2016 | | |
| CN | 105810406 A | 7/2016 | | |
| CN | 205752461 U | 11/2016 | | |
| CN | 107006118 A | 8/2017 | | |
| CN | 107086212 A | 8/2017 | | |
| CN | 107452481 A | 12/2017 | | |
| CN | 107919350 A | 4/2018 | | |
| CN | 207274460 U | 4/2018 | | |
| CN | 108231607 A | 6/2018 | | |
| CN | 108492965 A | 9/2018 | | |
| CN | 108648902 A | 10/2018 | | |
| EP | 1168384 A1 | 1/2002 | | |
| EP | 1835604 A1 | 9/2007 | | |
| EP | 2482312 A2 | 1/2012 | | |
| JP | H11340085 A | 12/1999 | | |
| JP | 2007171159 A | 7/2007 | | |
| JP | 2009225612 A | 10/2009 | | |
| JP | 2012060796 A | 3/2012 | | |
| JP | 2012152104 A | 8/2012 | | |
| JP | 2014168038 A | 9/2014 | | |
| TW | 200402812 A | * | 2/2004 | H01L 21/4846 |
| TW | 201537722 A | 10/2015 | | |
| TW | 201837934 A | 10/2018 | | |
| WO | 2008/139393 A1 | 11/2008 | | |
| WO | 2018012059 A1 | 1/2018 | | |
| WO | 2018043318 A1 | 3/2018 | | |
| WO | 2018190075 A1 | 10/2018 | | |
| WO | 2021211682 A1 | 10/2021 | | |

OTHER PUBLICATIONS

Corresponding India office action issued on Apr. 7, 2021.
The Office Action of U.S. Appl. No. 16/735,716 mailed on Sep. 10, 2021.
Machine translation of CN101378049.
Corresponding India office action issued on Aug. 31, 2021.
Corresponding China Notice of Allowance issued on Jan. 20, 2022.
Corresponding India office action issued on Oct. 25, 2021.
Corresponding China office action issued on Jul. 21, 2021.
Corresponding China office action issued on Nov. 3, 2022.
Corresponding US office action issued on Sep. 13, 2022.
Corresponding US office action issued on Mar. 19, 2021.
Corresponding China Notice of Allowance issued on Nov. 14, 2022.
Corresponding China office action issued on May 31, 2021 with its translation.
Corresponding China office action issued on Mar. 21, 2022 with its translation.
The office action of corresponding CN application No. 201910796711.7 issued on Jul. 1, 2023.
The office action of corresponding U.S. Appl. No. 16/735,715 issued on May 25, 2023.

(56) References Cited

OTHER PUBLICATIONS

The office action of corresponding U.S. Appl. No. 17/015,154 issued on Jul. 14, 2023.
Hearing Notice in Reference of India Application No. 201724037596 dispatched on Oct. 12, 2023.

* cited by examiner

FABRICATION METHOD FOR AN INDUCTOR WITH A VERTICAL VINDING AND INJECTION MOLDING TOOLING THEREOF

CROSS-REFERENCE TO RELATED APPLICATION

This application claims priority to Chinese Patent Application No. 201910013476.1, filed on Jan. 7, 2019, which is hereby incorporated by reference in its entirety.

TECHNICAL FIELD

The disclosure relates to a fabrication method of an inductor with a vertical winding and an injection molding tooling thereof, and belongs to the technical field of power electronics.

BACKGROUND

As a basic electronic component, the inductor is widely used in the power circuit. Existing inductors mainly include the inductor with a horizontal winding and the inductor with a vertical winding. The inductor with the vertical winding is beneficial to vertical heat dissipation, especially when such an inductor is stacked with the chip to form a power module, and additionally beneficial to upward heat transfer and dissipation comparing with the inductor with the horizontal winding.

Nowadays, high frequency power modules with the inductor are widely required in more applications, thus it is necessary to reduce the volume of the inductor and increase its saturation current in response to the demand of smaller high frequency power modules. Therefore, the search for how to produce an inductor suitable for high-frequency power module is becoming increasingly urgent. However, in the prior art, the winding of the inductor needs to be clamped and positioned first before producing the inductor by means of magnetic material injection. This method is relatively easy to be realized for the horizontal winding, but it is difficult for the vertical winding to be clamped and positioned by a clamp. In addition, for a coupled inductor, in which multiple vertical windings are arranged side by side, it is difficult laying the vertical windings flat for the injection because the vertical winding is susceptible to deformation or displacement during the magnetic material injection, seriously degrading the inductor quality.

SUMMARY

The present disclosure provides a fabrication method of an inductor with a vertical winding and an injecting molding tooling thereof, so as to address the above or other potential problems of the prior art.

An aspect of the present disclosure provides a fabrication method of an inductor with a vertical winding, including: providing a conductive member that includes a connection piece and a pillar, the connection piece including a first surface and a second surface that are oppositely arranged, and the pillar being disposed on the first surface; injecting a magnetic material onto the conductive member, such that the magnetic material and the conductive member form an integrated structure; and cutting the connection piece to form the vertical winding.

Another aspect of the present disclosure provides an injection molding tooling of an inductor with a vertical winding, including: an upper punch, a molding cavity body and a lower punch, the lower punch being configured to bear a connection piece of a conductive member, the molding cavity body being disposed around a periphery of a pillar of the conductive member, and the upper punch being configured to stamp a magnetic material, such that the magnetic material and the conductive member form an integrated structure.

According to the solution of the embodiment of the present disclosure, an inductor with a vertical winding can be fabricated, and the possibility of deformation in, or displacement of, the vertical winding can be reduced.

Some advantages of additional aspects of the disclosure will be set forth in the description below, some will become apparent from the description below, or will be appreciated through the practice of the disclosure.

BRIEF DESCRIPTION OF THE DRAWINGS

The above and other objectives, features and advantages of the embodiments of the present disclosure will be more easily understood by reference to the following detailed description of the appended drawings. In the appended drawings, multiple embodiments of the disclosure will be illustrated by way of example in a non-limiting manner, where.

DESCRIPTION OF EMBODIMENTS

Figure 1A:
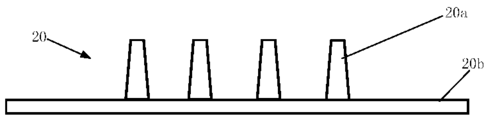
FIG. 1*a* to FIG. 1*h* are schematic diagrams illustrating a fabrication method provided in Embodiment 1 of the present disclosure.

Embodiments of the present disclosure are described in detail below, and examples of the embodiments are illustrated in the appended drawings, where like elements or elements having like functions are identified by like reference numerals throughout the appended drawings. The embodiments described below with reference to the appended drawings are exemplary, and are intended to be illustrative, and not to be construed as a limitation, of the disclosure.

It should be understood that the following embodiments do not limit the sequence of steps in the method protected by the present disclosure. Each step of the method of the present disclosure can be performed in any possible order and in a cyclical manner as long as no contradiction arises.

Embodiment 1

Figure 1B:
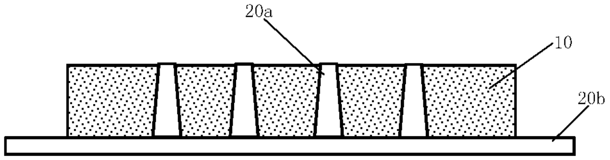
Figure 1C:
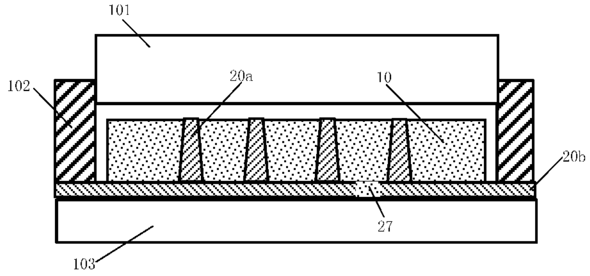
Figure 2:
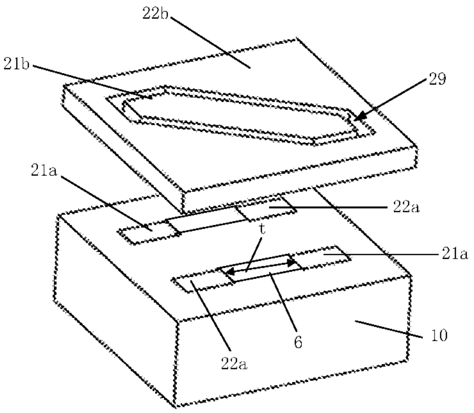
FIG. 2 is a schematic structural diagram of an inductor fabricated according to the fabrication method of FIG. 1*a* to FIG. 1*h*.

FIG. 1*a* to FIG. 1*c* are schematic diagrams illustrating a process of a fabrication method of an inductor having a vertical winding according to the present embodiment, and FIG. 2 is a schematic structural diagram of an inductor fabricated according to the fabrication method of FIG. 1*a* to FIG. 1*c*.

Firstly, as shown in FIG. 1*a*, there is provided a conductive member 20 which includes a connection piece 20*b* and a plurality of conductive pillars 20*a* disposed on the surface of the connection piece 20*b*. The pillar 20*a* can be perpendicular to the connection piece 20*b*, and can be produced in various ways, such as etching on a copper sheet, or electroplating, stamping, engraving, or welding onto the connection piece 20*b*.

Still referring to FIG. 1*a*, the plurality of pillars 20*a* are spaced apart on the upper surface of the connection piece.

Figure 1D:
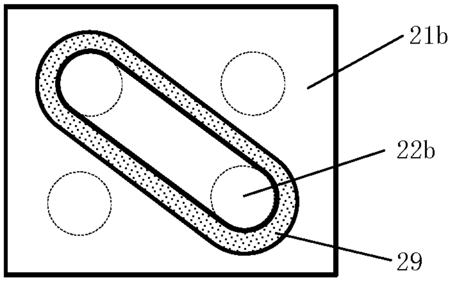
Figure 1E:
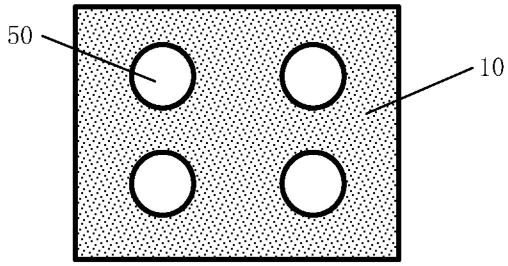

For example, they may be linearly arranged, e.g., be arranged in a row. Alternatively, they may be arranged as a matrix pattern, e.g., in a plurality of rows and pillars, such as two rows and two pillars as shown in FIG. 1*d* or FIG. 1*e*. Preferably, the conductive member 20 that arranges pillars 20*a* into a matrix form is particularly beneficial to formation of multi-phase coupled magnetic elements. In other words, the conductive member 20 that arranges pillars 20*a* into a matrix form is more beneficial to the panel type production method and to production efficiency improvement. However, the process of the present disclosure has an enhanced applicability to formation of magnetic elements through injection on a conductive member 20 on which pillars 20*a* are arranged in a matrix form. The profile (i.e., the longitudinal section) of the pillar 20*a* may be a trapezoid as shown in FIG. 1*a*, or may be a rectangle. The pillar 20*a* having a trapezoidal profile is more beneficial to flowing of the magnetic material during the injection process, reducing the force applied onto the pillar 20*a* during the injection process. The pillar 20*a* having a rectangular profile has more uniform resistance along the direction of the current flow while serving as the winding of the magnetic element, thereby facilitating improvement of the utilization rate of materials used for producing the conductive member 20. The cross section of the pillar 20*a* may be a circle, as shown in FIG. 1*e*, or it may also be a rectangle, as shown in FIG. 2. Certainly, shapes of both the longitudinal section and the cross section of the pillar 20*a* are not limited to the above shapes. Rather, they can be flexibly set to any suitable shape according to the formation process of the pillar 20*a*.

Then, as shown in FIG. 1*b*, a magnetic material 10 is injected onto the conductive member 20 shown in FIG. 1*a* by using a molding tooling. Specifically, the magnetic material 10 is injected from the top (i.e., the pillar side) of the conductive member 20 onto the conductive member 20. When the magnetic material 10 is injected onto the conductive member 20, since the pillar 20*a* of the conductive member 20 and the connection piece 20*b* are integrated, the structure of the conductive member 20 can remain essentially stable throughout the injection process. For example, when a magnetic material of a powder core type, such as magnetic powder, is used for injection, the impact force onto the pillar 20*a* during the injection process can be fairly absorbed by the connection piece 20*b*, and the impact force from the magnetic powder to the pillar 20*a* can become more manageable. In some examples, when the height of the pillar 20*a* is relatively small, and the section of the pillar 20*a* is a cylinder, particularly, a tapered cylinder, the degree of displacement and deformation between pillars 20*a* becomes much smaller, thereby being beneficial to improvement of accuracy of characteristics for the magnetic element, such as accuracy of the inductance, or accuracy of leakage inductance.

FIG. 1*c* illustrates a structure of an injection molding tooling on the basis of FIG. 1*b*. As shown in FIG. 1*c*, the injection molding tooling includes: an upper punch 101, a molding cavity body 102 and a lower punch 103. During the injection, the connection piece of the conductive member 20 is firstly placed on the lower punch 103, and the molding cavity body 102 is then placed, so that the molding cavity body 102, the conductive member 20 and the lower punch 103 enclose an injection molding cavity. After the magnetic material 10 is filled into the injection molding cavity, the magnetic material 10 and the conductive member 20 are integrated through pressing by the upper punch 101. Certainly, during the injection process, the injection molding tooling or the magnetic material can also be heated to ensure that injection molding is performed on the magnetic element at a suitable temperature, to improve its density and performance. Certainly, it is also possible to provide a through hole 27 on the connection piece 20*b*, as shown in FIG. 1*c*. In some examples, the magnetic material 10 may be accommodated within the through hole 27, as shown in FIG. 1*c*, to reinforce the connection between the magnetic material 10 and the conductive member 20. In other examples, the through hole 27 may also be used as part of the magnetic circuit.

As shown in FIG. 1*d* (which corresponds to the bottom view of FIG. 1*b*), an annular separation groove 29 is cut into the connection piece 20*b* by etching, engraving or other suitable means to divide the connection piece 20*b* into two parts, i.e., 21*b* and 22*b*. As a result, a portion of the winding is crossed outside the magnetic channel. Taking FIG. 1*d* as an example, the winding is crossed at the lower end of the magnetic channel to form an inductor with crossed windings. Specifically, FIG. 1*d* shows a method of cutting the area on the connection piece corresponding to four adjacent pillars to form crossed vertical windings. Obviously, the four adjacent pillars shown in FIG. 1*d* are arranged in a matrix of two rows and two pillars.

Figure 1F:
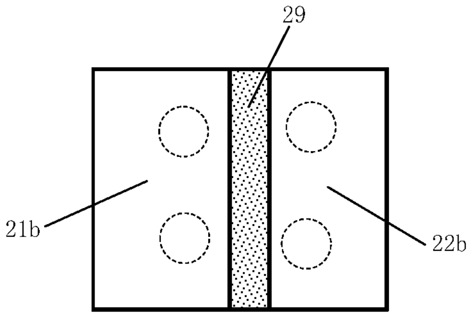

It should be understood that, although FIG. 1*d* divides the connection piece 20*b* into two larger parts by the separation groove 29, in other examples, a vertical separation groove 29 (of course, a horizontal separation groove 29 is also possible) can be cut into the connection piece, as shown in FIG. 1*f*, so that the connection piece is divided into two parts, i.e., 21*b* and 22*b*, so as to form a coupled inductor with non-crossed windings. Obviously, the four adjacent pillars shown in FIG. 1*f* are also arranged in two rows and two pillars.

Moreover, in other examples, the connection piece 20*b* can be further cut into even smaller parts, as will be described below.

The bottom of the inductor shown in FIG. 1*f* is the same as that shown in FIG. 1*d*, and both are the same as shown in FIG. 1*e* (which corresponds to the top view of FIG. 1*b*). A plurality of pads 50 are formed at the other end of the magnetic channel. Taking FIG. 1*b* as an example, the pad 50 is formed at the upper end of the magnetic channel.

Figure 1G:
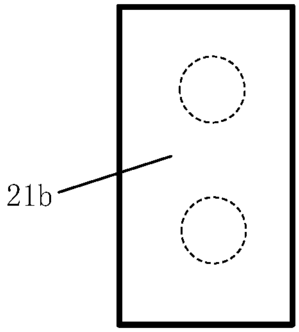
Figure 1H:
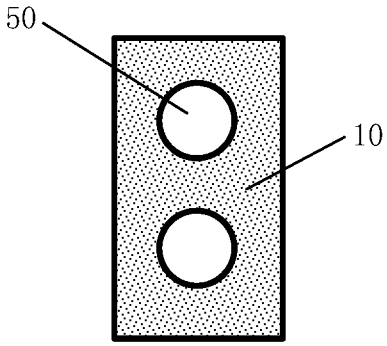

It should be noted here that, according to the needs of the production process, in some examples, the inductor produced according to the above method may be further cut, for example, a molding part of a panel may be cut into individual magnetic elements, or the connection piece 20*b* may be cut. For example, FIG. 1*g* and FIG. 1*h* illustrate that FIG. 1*b* is cut into a single-phase inductor, where FIG. 1*g* is the top view, FIG. 1*h* is the bottom view, and 50 indicates a pad. In other examples, insulation is applied to the cut surface (such as a magnetic surface), or the conductive portion partially covered by a magnetic is de-burred, or deflashing is applied to the overflow magnetic material covering the winding, that is, part of the magnetic material is removed to expose the conductive portion, such as the pad 50. Alternatively, the surface of the magnetic element is coated with a highly magnetically permeable material to facilitate magnetic field shielding.

Further, in some examples, the magnetic material may be injected, or the permeability material may be filled, into the separation groove 29. That is, the magnetic material is secondarily injected, or the permeability material is filled, from the pillar-free side to the conductive member 20, so as to increase the number of magnetic channels.

FIG. 2 illustrates an inductor with crossed windings produced according to the method for producing an inductor shown in FIG. 1. As shown in FIG. 2, two vertical windings 21*a* and one horizontal winding 21*b* form a first winding, two vertical windings 22*a* and one horizontal winding 22*b* form a second winding, and the first winding and the second winding cross on the same horizontal plane, and the crossed portion thereof are the horizontal windings 21*b* and 22*b*. The vertical windings 21*a* and 22*a* may be squares, disks, or other shapes. Certainly, the magnetic material 10 is also injected to the outside of the first winding and the second winding. See FIG. 1*d* and FIG. 1*e* for the top view and the bottom view of FIG. 2.

Furthermore, FIG. 2 also shows a gap 6 and a spacing t between vertical windings 21*a* and 22*a*. In some examples, magnetic materials having different relative magnetic permeability may be added into the gap 6 between the vertical windings 21*a* and 22*a* to adjust the coupling coefficient. In other examples, the coupling coefficient can also be adjusted by, for example, adjusting the spacing t between the vertical windings 21*a* and 22*a*.

Embodiment 2

Figure 3A:
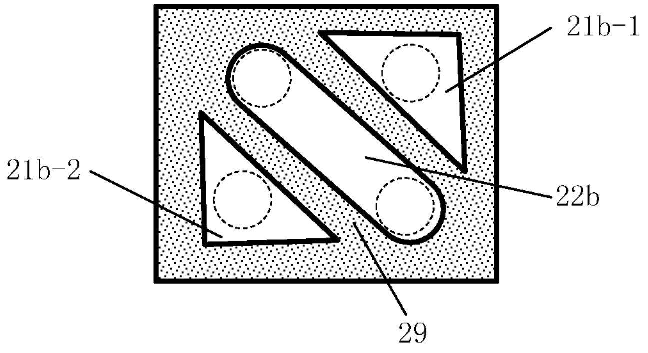
FIG. 3*a* to FIG. 3*c* are schematic diagrams illustrating a fabrication method provided in Embodiment 2 of the present disclosure.
Figure 3B:
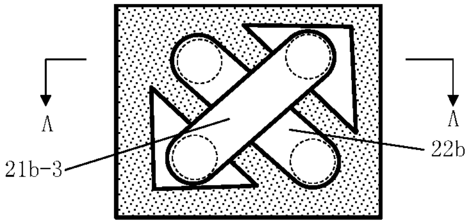
Figure 3C:
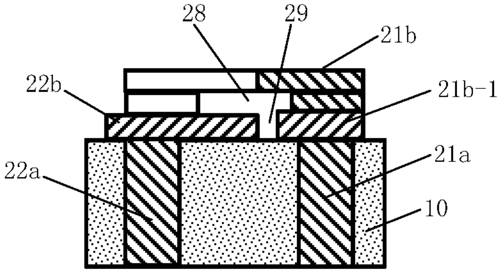
Figure 4:
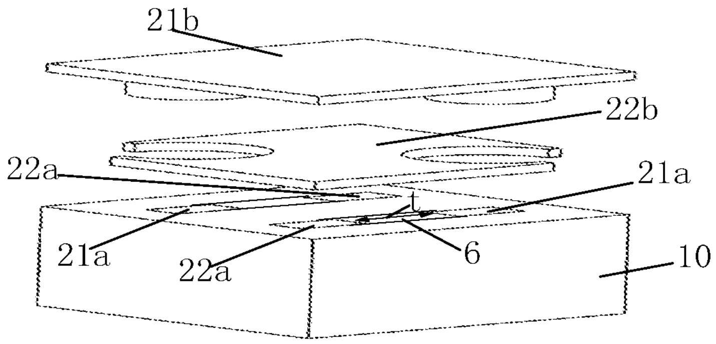
FIG. 4 is a schematic structural diagram of an inductor fabricated according to the fabrication method of FIG. 3*a* to FIG. 3*c*.

The difference between the present embodiment and Embodiment 1 is that the shape of the separation groove 29 formed on the connection piece is different. As shown in FIG. 3*a*, the present embodiment expands the separation groove 29 on the basis of FIG. 1*d*, so that the connection piece 21*b* is divided into two separate parts, i.e., 21*b*-1 and 21*b*-2. Then, as shown in FIG. 3*b*, the connection piece 21*b*-3 is welded to the connection pieces 21*b*-1 and 21*b*-2 to join the two, and is insulated from 22*b*, so as to form a three-dimensional crossed anti-coupled inductor. FIG. 3*c* illustrates a cross-sectional view of the inductor shown in FIG. 3*b*, and FIG. 4 illustrates an exploded view of the inductor shown in FIG. 3*b*. As shown in FIG. 4, there is a gap 6 between the vertical windings 21*a* and 22*a*, with the spacing of the gap 6 being t, and the gap 6 and the spacing t will be used below for adjusting the coupling coefficient.

Embodiment 3

Figure 5A:
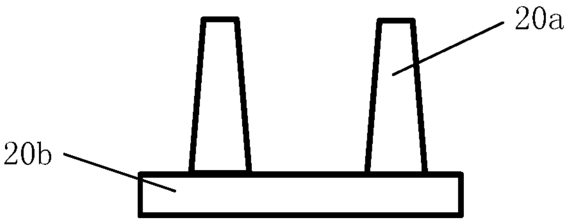
FIG. 5*a* to FIG. 5*d* are schematic diagrams illustrating a fabrication method provided in Embodiment 3 of the present disclosure.

The difference between the present embodiment and Embodiment 1 is that the magnetic material 10 surrounds the entire conductive member 20. As shown in FIG. 5*a*, the conductive member 20 includes the connection piece 20*b* and the conductive pillar 20*a*. Refer to above embodiments for the fabrication method of the conductive member 20, which will not be repeated herein.

Figure 5B:
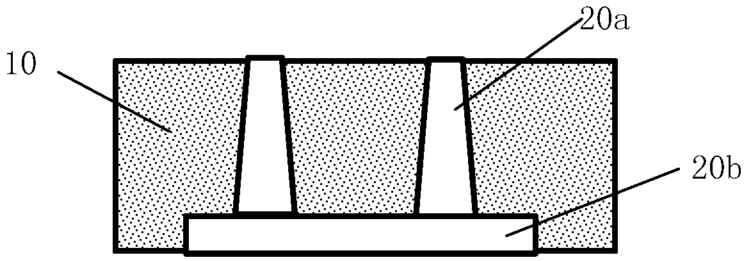
Figure 5C:
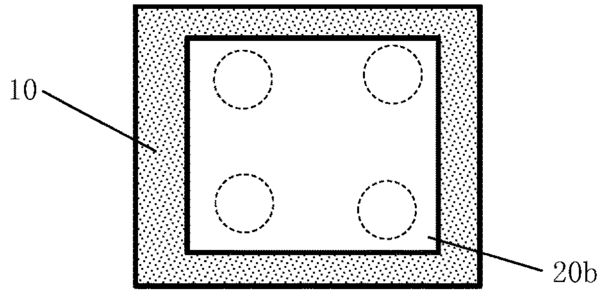
Figure 5D:
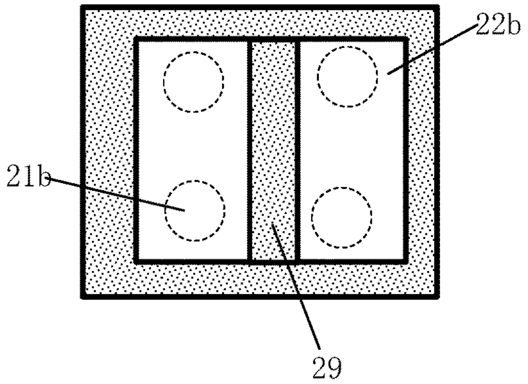

As shown in FIG. 5*b* to FIG. 5*d*, the magnetic material 10 is injected from the top of the conductive member 20 onto the conductive member 20, so that the magnetic material 10 is integrated with the connection piece 20*b* and the pillar 20*a*. In the present embodiment, the connection piece 20*b* is wrapped around by the magnetic material 10. Thus, the magnetic material 10 surround the periphery can effectively enhance the magnetic flux around all the pillars 20*a*, provide an effective magnetic channel, and is beneficial to reducing magnetic loss, enhancing saturation capacity, improving efficiency and shrinking volume.

Still referring to FIG. 5*d*, the vertical separation groove 29 is formed to divide the 20*b* into two parts, i.e., 21*b* and 22*b*. Certainly, the manner in which the separation groove 29 is formed is also applicable to the method described in the above embodiments. Similarly, in the present embodiment, the magnetic material may also be added into the separation groove 29 as done in the above embodiment.

Figure 6:
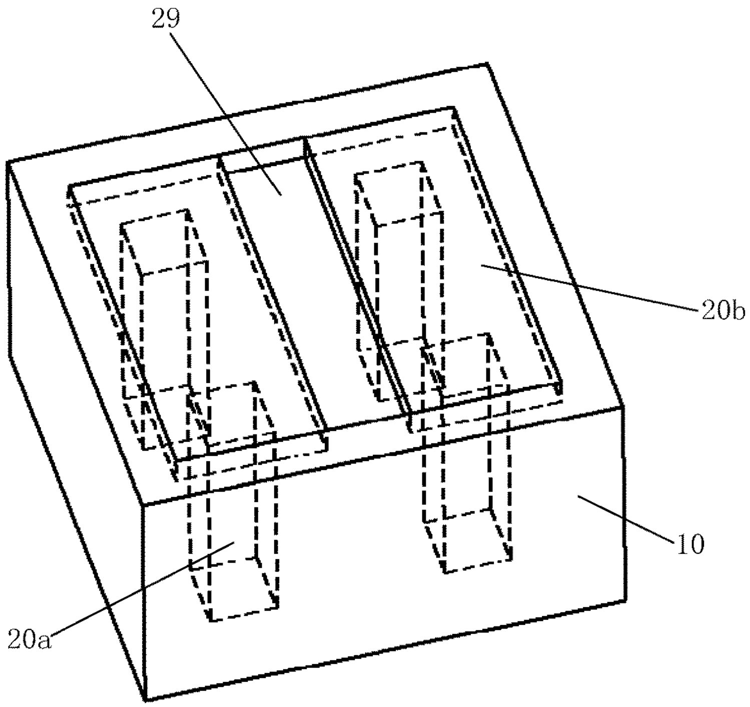
FIG. 6 is a schematic structural diagram of an inductor fabricated according to the fabrication method of FIG. 5*a* to FIG. 5*d*.

FIG. 6 is a perspective view illustrating the stereoscopic structure of the inductor shown in FIG. 5*b* to FIG. 5*d*. As can be seen from FIG. 6, it is an inductor with a non-crossed winding, that is, the four pillars 20*a* arranged in two rows and two pillars in the diagram do not electrically connect two diagonally symmetrical pillars 20*a* together as shown in FIG. 2. Rather, they electrically connect the adjacent two pillars 20*a* (it is shown in FIG. 6 that two pillars 20*a* on the left side are electrically connected, at the same time, two pillars 20*a* on the right side are also electrically connected).

Embodiment 4

The difference between FIG. 7 and Embodiment 2 is that both windings for the crossing are located at the same end of a magnetic channel in Embodiment 2, but at two ends of the magnetic channel (at different side of the magnetic core) in the present embodiment, thus projections of the two windings for the crossing in the present embodiment cross each other on the end surface of the magnetic channel. As shown in FIG. 7*a*, the connection piece 21*b* is completely removed when the separation groove 29 is formed at one end surface of the magnetic channel as shown in FIG. 1*d*, leaving only the connection piece 22*b*.

Figure 7A:
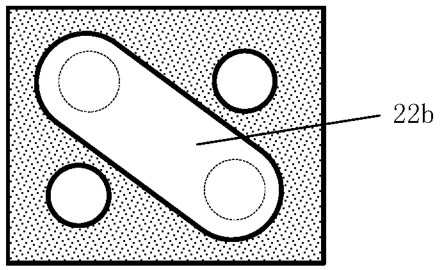
FIG. 7*a* to FIG. 7*d* are schematic diagrams illustrating a fabrication method provided in Embodiment 4 of the present disclosure.
Figure 7B:
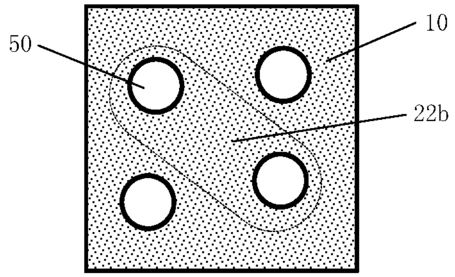
Figure 7C:
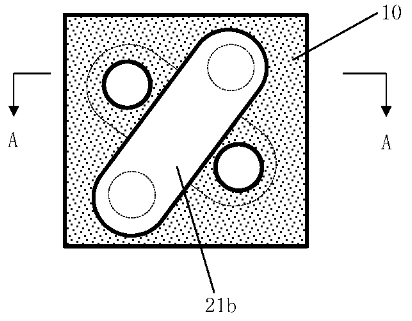
Figure 7D:
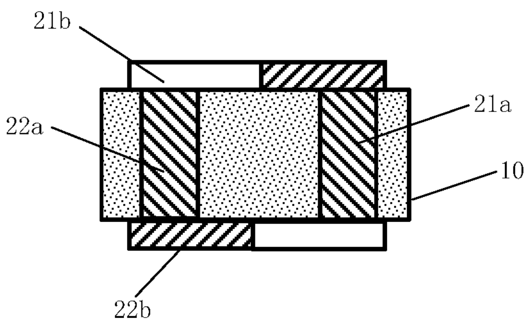
Figure 8:
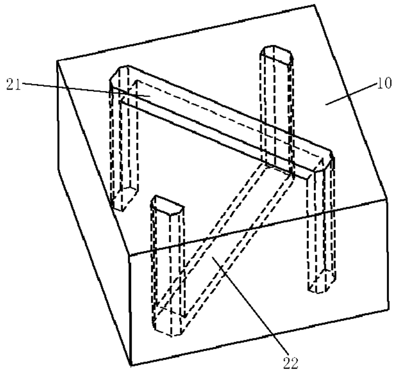
FIG. 8 is a schematic structural diagram of an inductor fabricated according to the fabrication method of FIG. 7*a* to FIG. 7*d*.

FIG. 7*b* is a view of the other end surface of the magnetic channel of the structure shown in FIG. 7*a*. As shown in FIG. 7*b*, the connection piece 22*b* (shown in dashed lines) and two pillars 20*a* electrically connected thereto form a first winding, and two ends of the first winding form two pads 50. Then, as shown in FIG. 7*c*, the connection piece 21*b* is provided on the basis of the end surface of the magnetic channel shown in FIG. 7*b*, electrically connecting the other two pillars 20*a*, so as to form a second winding. FIG. 7*d* is a cross-sectional view taken along A-A of FIG. 7*c*, and FIG. 8 is a perspective view illustrating the stereoscopic structure of the inductor shown in FIG. 7*c*. As shown in FIG. 8, the first winding and the second winding cross at two ends of the magnetic channel, that is, the projections of both the first winding and the second winding on the same plane cross with each other. Understandably, such a projection surface can be any end surface of the magnetic channels in FIG. 8 (i.e., the upper surface or the lower surface in FIG. 8).

Embodiment 5

Figure 9:
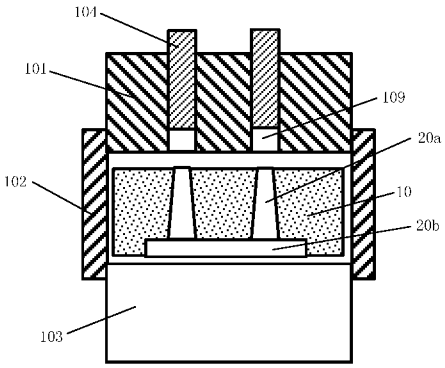
FIG. 9 is a schematic diagram illustrating a fabrication method provided in Embodiment 5 of the present disclosure, where an end part of the vertical winding is exposed after injection.

As shown in FIG. 9, the difference between the present embodiment and the above embodiments is that a through hole 109 is provided at a position on the upper punch of the injection molding tooling corresponding to the pillar 20*a*, so that the magnetic material 10 will not be pressed from the top downwards onto the pillar 20*a* when the magnetic material 10 is being injected, and that the upper surface of the pillar 20*a* can be exposed after the completion of the injection, so that it may be used as a pad for external connection.

By the method of the present embodiment, it is possible to prevent the pillar 20*a* from being covered by the magnetic material 10, eliminating the need for any post processing to expose the upper surface of the pillar 20*a*, thereby simplifying the process and reducing the cost. Moreover, the upper punch 101 does not apply any pressure to the magnetic material 10 on the upper surface of the pillar 20*a*, that is, this part of the magnetic material 10 is prevented from transmitting the impact force from the injection molding tooling to the pillar 20*a*, thereby avoiding collapse, deformation or bending and improving the performance of the finished product.

Optionally, in order to facilitate cleaning of inner side of the through hole 109 and avoid excessive accumulation of the magnetic material 10 in the through hole 109 after a period of use, a piston 104 may be disposed in the through hole 109 as shown in FIG. 9. In this way, the piston 104 may be stamped down once every injection, or several injections, to remove the residue magnetic material 10 or other debris in the through hole 109, so as to effectively improve the injection efficiency of the injection molding tooling, thus increasing product yield and durability.

Embodiment 6

The difference between the present embodiment and the above embodiments is that the magnetic material 10 injected onto the conductive member 20 in the present embodiment includes at least two kinds of magnetic powders having different relative magnetic permeability.

Figure 10A:
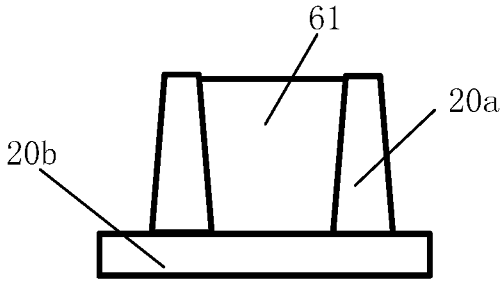
FIG. 10*a* to FIG. 10*d* are schematic diagrams illustrating a fabrication method provided in Embodiment 6 of the present disclosure, where different magnetically permeable materials are disposed between vertical windings.
Figure 10B:
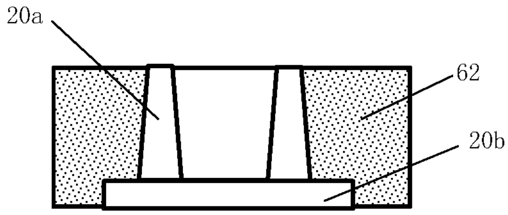
Figure 10C:
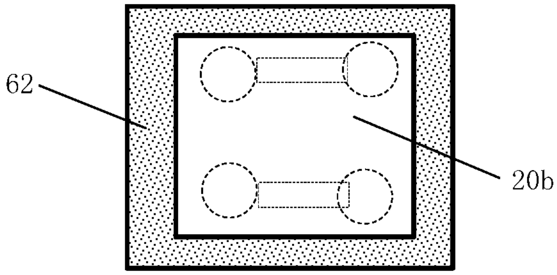
Figure 10D:
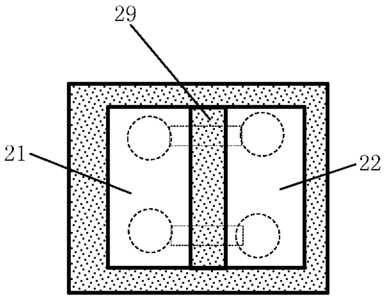

Still referring to FIG. 10*a*, second magnetic powder 61 is filled between at least two adjacent pillars 20*a*. The second magnetic powder 61 may also be pre-injected into a second magnetic core that is in turn pre-assembled with the conductive member 20 and then placed into a mold tooling, alternatively or simultaneously. Then, first magnetic powder 62 is filled into and injected over the outer side of the pillar 20*a* as shown in FIG. 10*b*, and the first magnetic powder 62 surrounds the second magnetic powder 61. FIG. 10*c* is a bottom view of FIG. 10*b* illustrating that the first magnetic powder 62 surround the conductive member 20. Afterwards, the separation groove 29 is formed by cutting as shown in FIG. 10*d*, thereby forming the first winding 21 and the second winding 22, which do not cross with each other. In the present embodiment, the second magnetic powders 61 having different magnetic permeability are disposed between the windings, offering benefits to adjustment of the coupling coefficient between the windings of the two phases, and expanding the applicability of the present process method to multi-phase coupled magnetic elements. In the present embodiment, the second magnetic powder 61 and the first magnetic powder 62 have different relative magnetic permeability. In some examples, the magnetic permeability of the second magnetic powder 61 is less than that of the first magnetic powder 62. For example, the relative magnetic permeability of the second magnetic powder 61 is approximately equal to 1, e.g., greater than or equal to 0.99 and less than or equal to 1.01, and may be, e.g., an epoxy resin material. Certainly, in other examples, the second magnetic powder 61 and the first magnetic powder 62 having the same relative magnetic permeability may also be used.

Certainly, in some examples, the second magnetic powder 61 may also be pressed to form a second magnetic core, and/or the first magnetic powder 62 may be pressed to form a first magnetic core, which may be pre-assembled with the conductive member 20 before being heated and pressurized to form an integrated whole. For example, the second magnetic powder 61 and the first magnetic powder 62 may be respectively pre-pressed to form a second magnetic core and a first magnetic core, be assembled with the conductive member 20, and then placed in an injection molding mold to be heated and pressurized to integrate the second magnetic core and the first core with the conductive member 20.

It will be readily appreciated that in some examples, only the magnetic material, rather than magnetic materials having different relative magnetic permeabilities may be wrapped around the conductive member 20. In other examples, it is also possible to use only a plurality of magnetic materials having different relative magnetic permeabilities, rather than a magnetic material, to wrap the conductive member 20 around the conductive member 20.

Embodiment 7

The difference between the present embodiment and the above embodiments is that the plurality of pillars 20*a* disposed on the connection piece 20*b* are integrated first, and the first magnetic powder 62 is injected first, and then the integrated magnetic pillar 61 is divided and be filled with the second magnetic powder 61. The second magnetic powder 61 may have a different relative magnetic permeability from the first magnetic powder 62, to form a magnetic element of a composite material.

Figure 11A:
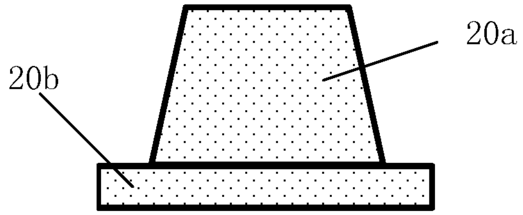
FIG. 11*a* to FIG. 11*i* are schematic diagrams illustrating a fabrication method provided in Embodiment 7 of the present disclosure, where different magnetically permeable materials are disposed between vertical windings.
Figure 11B:
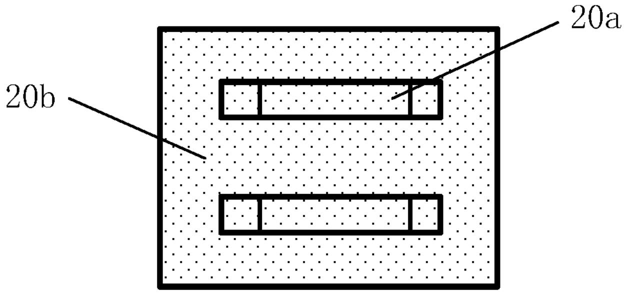
Figure 11C:
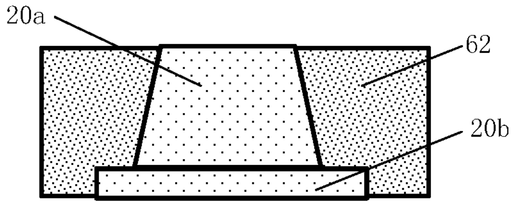
Figure 11D:
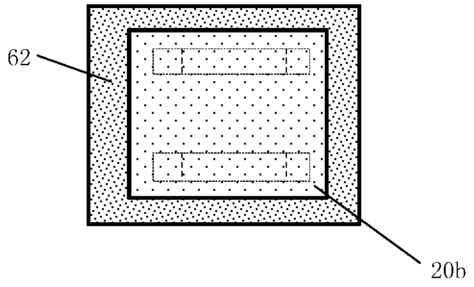
Figure 11E:
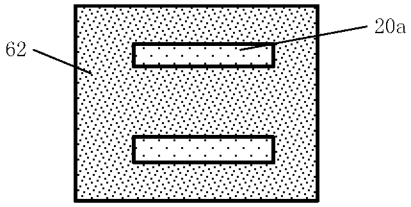
Figure 11F:
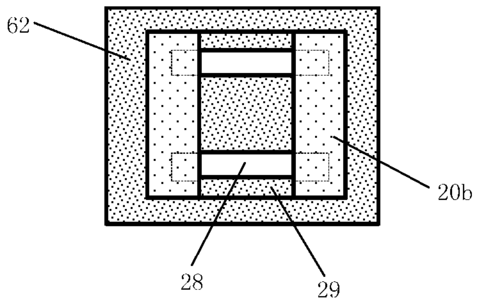
Figure 11G:
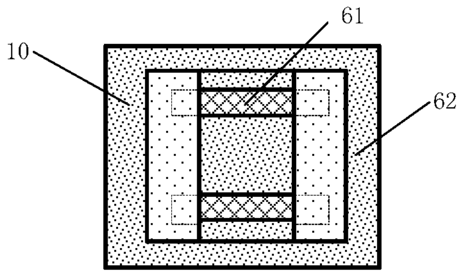

As shown in FIG. 11*a*, an elongated pillar 20*a* is provided on the connection piece 20*b*, and FIG. 11*b* is a top view of FIG. 11*a*. Then, as shown in FIG. 11*c*, the magnetic material 10 (i.e., the first magnetic powder 62) is injected onto the conductive member 20, or the pre-injection layer of the first magnetic powder 62 is pressed into a first magnetic core, and then assembled together with the conductive member 20. It should be understood that such assembling can be performed before or after the conductive member 20 is placed in the mold. FIG. 11*d* is a bottom view of FIG. 11*c*, and FIG. 11*e* is a top view of FIG. 11*c*. Then, as shown in FIG. 11*f*, a separation groove 29 is formed on the basis of FIG. 11*d* to expose the intermediate connection portion of the pillar 20*a*. Then, a separation groove 28 is formed on the intermediate connection portion. For example, the separation groove 28 can be formed by removing the intermediate connection portion by means of etching or laser cutting. Afterwards, as shown in FIG. 11*g*, on the basis of FIG. 11*f*, the second magnetic powder 61 having a different relative magnetic permeability is filled into the separation groove 28.

Figure 11H:
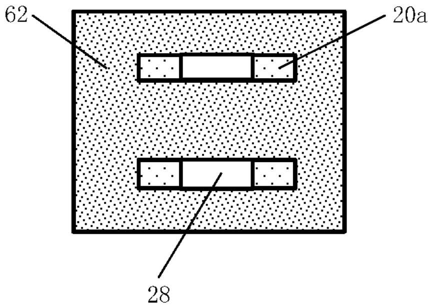
Figure 11I:
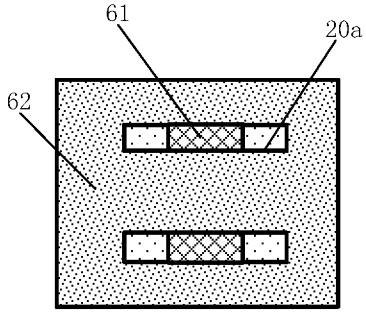

In other examples, as shown in FIG. 11*h*, a separation slot 28 may also be formed on the basis of FIG. 11*e*. Then, as shown in FIG. 11*i*, on the basis of FIG. 11*h*, second magnetic powder 61 having a different relative magnetic permeability is filled into the separation groove 28. Preferably, the relative magnetic permeability of the second magnetic powder 61 is less than that of the first magnetic powder 61. Preferably, the relative magnetic permeability of the second magnetic powder 61 is greater than or equal to 0.99 and less than or equal to 1.01, and may be, e.g., an epoxy resin material. Certainly, the second magnetic powder 61 may also be pre-pressed into a second magnetic core that is to be placed into the separation groove 28.

Embodiment 8

Figure 12:
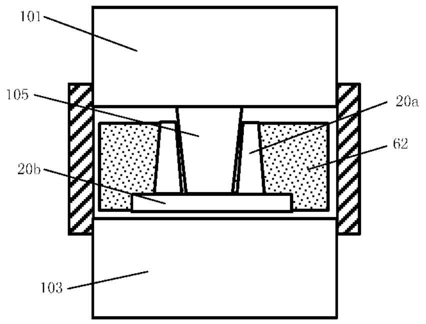
FIG. 12 is a schematic diagram illustrating a fabrication method provided in Embodiment 8 of the present disclosure.

As shown in FIG. 12, the difference between the embodiment and the above embodiments is that the upper punch 101 of the injection molding tooling is provided with a bump 105. When the injection is performed, the conductive member 20 is placed in the mold, and the first magnetic powder 62 or the first magnetic core pressed and formed from the first magnetic powder 62 is added. Certainly, when the first magnetic core is added, it is also possible that the first magnetic core and the conductive member 20 are pre-assembled and then put into the mold. Since the upper punch 101 is provided with the bump 105, the space between the pillars 20*a* can be filled by the bump 105, and then the separation groove 28 can be naturally formed after the injection is completed, and then the second magnetic powder 61 is filled into the separation groove 28 as shown in FIG. 11*g* or FIG. 11*i*, as described in Embodiment 7. Preferably, the relative magnetic permeability of the second magnetic powder 61 is less than that of the first magnetic powder 62. Preferably, the relative magnetic permeability of the second magnetic powder 61 is greater than or equal to 0.99 and less than or equal to 1.01, and may be, e.g., an epoxy resin material. Certainly, the second magnetic powder 61 may be pre-pressed into the magnetic core that is placed into the separation groove 28.

It should be noted that in the Embodiments 6 to 8, the magnetic element is realized by using various kinds of magnetic powder, which can realize a magnetic element of a composite magnetic powder material of various structural forms. For example, the second magnetic powder may be arranged between at least two adjacent pillars 20*a*. Then the first magnetic powder surrounds the second magnetic powder. The phrase "first magnetic powder surrounds the second magnetic powder" may be implemented in that the first magnetic powder surrounds the second magnetic powder and the two adjacent pillars 20*a*, as shown in FIG. 10*c* and FIG. 11*i*. In addition, when a second magnetic powder is also disposed between the other two adjacent pillars in FIG. 10*b* and four segments of the second magnetic powder and the pillars are linked together to form a ring structure, then the first magnetic powder around all of the pillars will encloses all the pillars and the second magnetic powder. Generally, the phrase "first magnetic powder surrounds the second magnetic powder" is intended to mean that some of the intersection points between rays, which are drawn from the second magnetic powder towards any direction parallel to the connection piece 20*b*, and the first magnetic powder can always be selected to form a closed curve surrounding the second magnetic powder.

Embodiment 9

The difference between the present embodiment and the above embodiments is that the magnetic material is firstly pre-pressed into a magnetic core matching the shape of the conductive member 20, and then the magnetic core and the conductive member 20 are assembled together, and then integrated as a whole by injection.

Figure 13A:
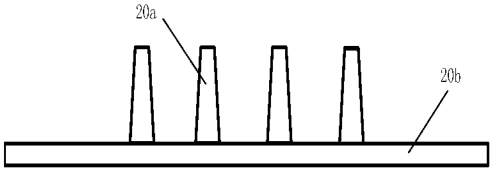
FIG. 13*a* to FIG. 13*c* are schematic diagrams illustrating a fabrication method provided in Embodiment 9 of the present disclosure.
Figure 13B:
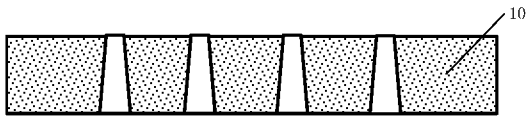
Figure 13C:
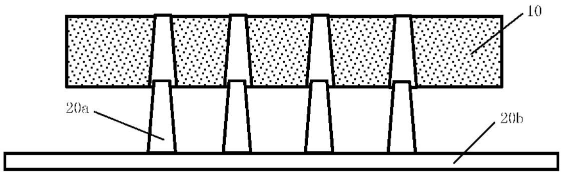

Specifically, as shown in FIG. 13*a*, there is provided a conductive member 20 including a connection piece 20*b* and a pillar 20*a* that is disposed on the connection piece and capable of conducting electricity. As shown in FIG. 13*b*, there is provided a magnetic core that is pre-pressed and at least has a hole structure matching the pillar 20*a*, that is, the shape of the magnetic core structure matches the surface shape of the side of the conductive member 20 having the pillars. Then, as shown in FIG. 13*c*, the magnetic core structure and the conductive member 20 are pre-assembled and then placed into a mold. The magnetic core structure and the conductive member 20 with the pillar 20*a* are integrated by injection using an injection molding die. During the injection process, at least one of the injection molding tooling and the magnetic core may be heated to a suitable temperature to facilitate the formation of the integrated structure. Certainly, the magnetic material 10 can also be pre-pressed into a plurality of magnetic cores that are then pre-assembled with the conductive member 20 before being placed into the mold to be integrated. In some examples, different materials may be used for the magnetic cores. For example, materials having different relative magnetic permeabilities may be used separately. Please refer to the above embodiments for the process after the completion of the injection, which will not be repeated again.

In the fabrication method of the present embodiment, the force applied to the pillar 20*a* during the injection process can be reduced, thereby reducing the deformation of the pillar 20*a*.

Embodiment 10

Figure 14A:
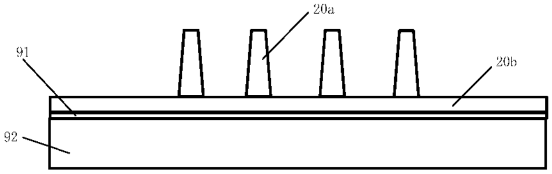
FIG. 14*a* and FIG. 14*b* are schematic diagrams illustrating a fabrication method provided in Embodiment 10 of the present disclosure.

As shown in FIG. 14*a*, the difference between the present embodiment and the above embodiments is that, when the connection piece 20*b* is large or relatively thin, a reinforcement part 92 is bonded by an adhesive 91 onto a surface of the connection piece 20*b,* facing away from the pillar 20*a* to reduce the deformation of the connection piece 20*b,* thereby improving the accuracy of the inductor.

Specifically, the connection piece 20*b* may be integrated with a part having higher strength and rigidity (i.e., the reinforcement part 92) by a temperature-sensitive adhesive, or a chemical sensitive adhesive, or a photosensitive adhesive or the like, thereby increasing the strength of the connection piece 20*b* through the reinforcement part 92.

Figure 14B:
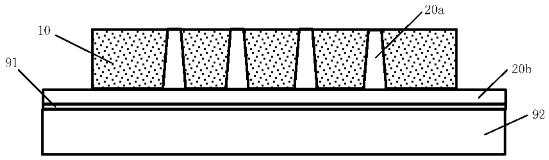

Then, as shown in FIG. 14*b*, the magnetic material 10 is injected from the side of the conductive member 20 with the pillar onto the conductive member 20, so that the magnetic material 10 is integrated with the connection piece 20*b* and the pillar 20*a*.

Next, the adhesive 91 may be subjected to a degumming treatment by heating, chemical treatment, or light exposure according to actual needs, so that the connection piece 20*b* is detached from the reinforcement part 92. It will be readily appreciated that if the chemical treatment is employed for the degumming, it may be necessary to form the reinforcement part 92 into a porous structure having a plurality of vertical through holes to facilitate penetration of the chemicals. Similarly, if the reinforcement part 92 and the connection piece 20*b* are separated by a photosensitive method, it may be necessary to make the reinforcement part 92 to be transparent.

Embodiment 11

Figure 15:
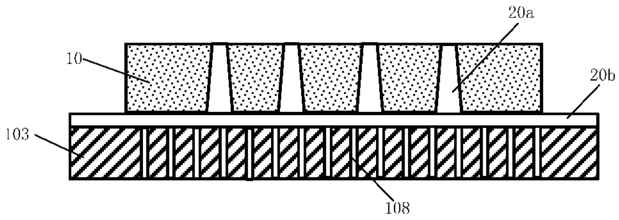
FIG. 15 is a schematic diagram illustrating a fabrication method provided in Embodiment 11 of the present disclosure.

As shown in FIG. 15, the difference between the present embodiment and the above embodiments is that a plurality of vertical adsorption through holes 108 are disposed on the undershoot 103, and then the connection piece 20*b* can be adsorbed to the undershoot 103 by means of vacuum adsorption, to facilitate subsequent injection of the magnetic material 10 onto the conductive member 20.

Embodiment 12

Figure 16A:
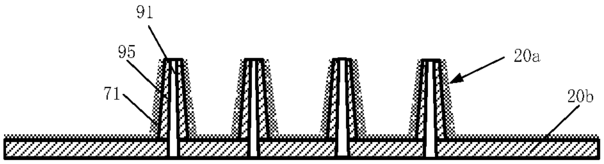
FIG. 16*a* and FIG. 16*b* are schematic diagrams illustrating a fabrication method provided in Embodiment 12 of the present disclosure, where surfaces of a connection piece and a vertical winding are coated or attached with a composite material.

As shown in FIG. 16*a*, the difference between the present embodiment and the above embodiments is that the conductive member 20*a* is composed of multiple layers. For example, in some examples, the pillar 20*a* can include a reinforcement inner core 91 and a conductive layer 95 that is coated over the reinforcement inner core 91. For example, the reinforcement inner core 91 may be a high-strength material, such as steel, and the conductive layer 95 may be a material having high electrical conductivity, such as copper or silver coated over the reinforcement inner core 91. Based on this, the rigidity and strength of the pillar 20*a* can be enhanced, thereby reducing the deformation of the pillar 20*a* during the injection. It should be noted that the present embodiment is particularly suitable for manufacturing a magnetic element in a high frequency environment since the current in the magnetic element in a high frequency application scenario primarily concentrate in its surface.

Figure 16B:
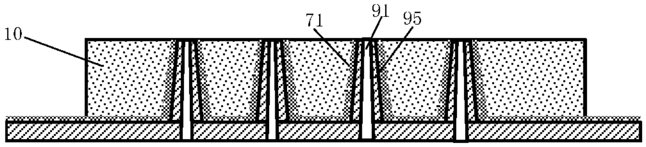

Still referring to FIG. 16*a*, in some examples, a layer of other material 71 may be further applied over the outer surface of the pillar 20*a* and the connection piece 20*b,* and then the magnetic material 10 is injected onto the pillar side of the conductive member 20 coated with the other material 71, as shown in FIG. 16*b*. Specifically, the other material 71 may be a high voltage resistant insulation material to increase the withstand voltage rating between pillars 20*a*. Alternatively, the other material 71 may be an etching resistant material, so that the underlying magnetic material 10 will not be damaged when the connection piece 20*b* is being etched to form the separation groove 29.

Embodiment 13

On the basis of the above embodiments, the present embodiment forms a new conductive trace between the pillars 20*a* by means of metallized wiring.

Figure 17A:
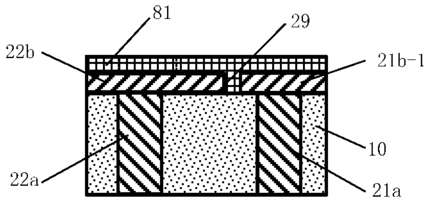
FIG. 17*a* to FIG. 17*c* are schematic diagrams illustrating three-dimensionally crossed windings connected through a metallization method as provided in Embodiment 13 of the present disclosure.
Figure 17B:
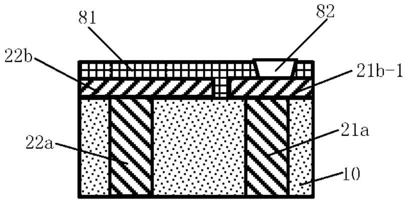
Figure 17C:
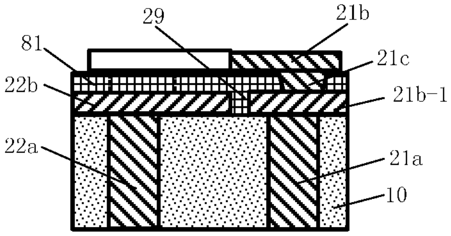

Specifically, as shown in FIG. 17*a*, which is equivalent to a cross-sectional view of FIG. 3*a*, an insulation material such as a PP material, an ABF material or the like is used to form an insulation layer 81 on the top of FIG. 3*a* (i.e., the surface of the conductive member 20 facing away from the pillar 20*a*). Then, as shown in FIG. 17*b*, a via 82 is formed on the top of the connection piece 21*b*-1. Finally, as shown in FIG. 17*c*, a metal conductive via 21*c* and a conductive layer 21*b* are generated by a metallization method.

Embodiment 14

In the present embodiment, on the basis of Embodiment 13, a conductive line is also formed on the surface of the pillar side of the connection piece by means of metalizing a wiring layer.

Figure 18A:
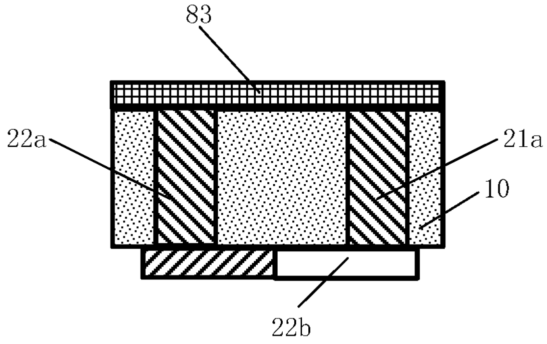
FIG. 18*a* to FIG. 18*c* are schematic diagrams illustrating double-side crossed windings connected through a metallization method as provided in Embodiment 13 of the present disclosure.
Figure 18B:
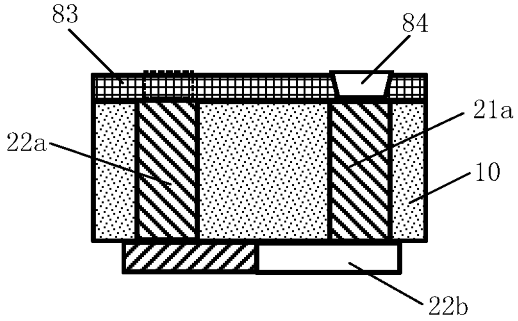
Figure 18C:
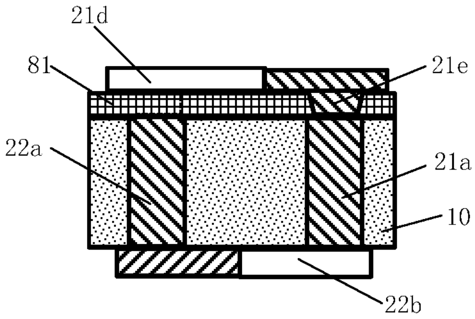

Specifically, as shown in FIG. 18*a*, the insulation layer 83 is formed using an insulation material such as a PP material, an ABF material or the like on the surface of the pillar side of the connection piece 20*b* (Certainly, the conductive member 20 has been injected with the magnetic material 10). Then, as shown in FIG. 18*b*, the through hole 84 is formed on the top of pillar 21*a.* Finally, as shown in FIG. 18*c*, a conductive via 21e and a conductive layer 21*d* are formed by means of a metallized method.

Embodiment 15

The difference between the present embodiment and the above embodiments is that the conductive member 20 of the present embodiment is fabricated by injection.

Figure 19A:
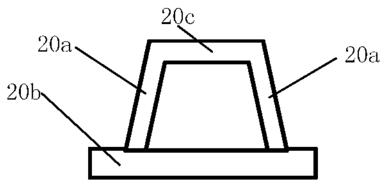
FIG. 19*a* to FIG. 19*f* are schematic diagrams illustrating a fabrication method provided in Embodiment 15 of the present disclosure, where the conductive member is formed by stamping a sheet metal.

As shown in FIG. 19*a*, a sheet metal, such as a copper plate, is provided to undergo stamping to form a connection piece 20*b* and a plurality of pillars 20*a* perpendicular to the surface of the connection piece 20*b*, that is, the sheet metal is stamped to produce the conductive member 20. In FIG. 19*a*, two pillars 20*a* are formed by stamping, and the two pillars 20*a* are also short-connected with each other through the short connection piece 20*c*. Certainly, the two pillars 20*a* and the short connection piece 20*c* may be regarded together as one pillar.

Figure 19B:
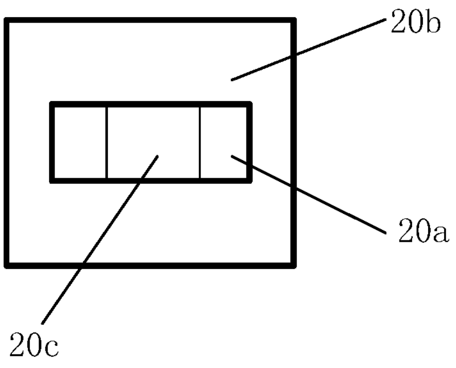

FIG. 19*b* is a top view of FIG. 19*a*. As shown in FIG. 19*b*, the adjacent two pillars 20*a* are integrated together through the connected part, i.e., the short connection piece 20*c.*

Figure 19C:
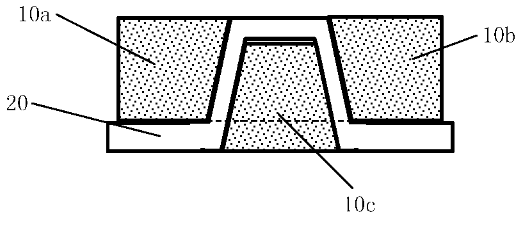
Figure 19D:
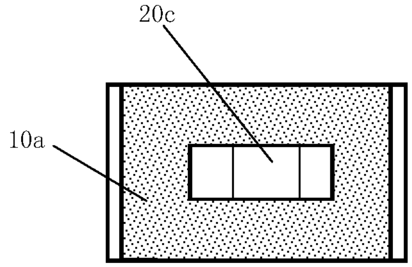
Figure 19E:
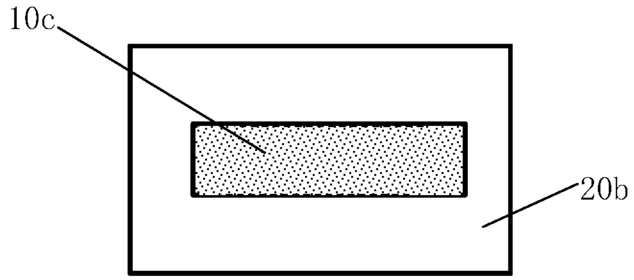

As shown in FIG. 19*c* to FIG. 19*e* (where FIG. 19*d* is a top view of FIG. 19*c* and FIG. 19*e* is a bottom view of FIG. 19*c*), the magnetic cores 10*a,* 10*b* and 10*c* are injected onto the conductive member 20. For example, these magnetic cores 10*a,* 10*b* and 10*c* may be pre-assembled with the conductive member 20 and then placed in an injection molding tooling for injection, so that the magnetic cores 10*a,* 10*b,* 10*c* and the conductive member 20 are integrated together. Certainly, rather than injecting the magnetic cores 10*a,* 10*b,* and 10*c* onto the conductive member 20, it is also possible to place the conductive member 20 in an injection molding tooling and then fill in the magnetic powder to integrate the magnetic powder and the conductive member 20 together to make the finished product. It can be understood that heating can be applied during the molding process. The magnetic cores 10*a* and 10*b* may be pre-integrated or pre-assembled. The materials of the magnetic cores 10*a,* 10*b,* and 10*c* may be the same or different. For example, materials having different relative magnetic permeability may be used, respectively.

Figure 19F:
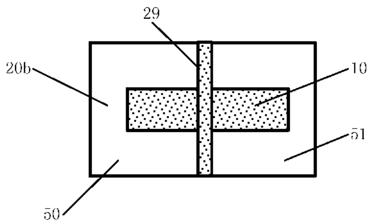

Finally, as shown in FIG. 19*f,* on the basis of FIG. 19*e*, a separation groove 29 is formed on the connection piece 20*b*. The two exposed conductive portions 50 and 51 shown in FIG. 19*f* can be used as lead pins.

Embodiment 16

The difference between the present embodiment and embodiment 15 is that the conductive member 20 is formed by stamping and bending the entire connection piece 20*b*.

Figure 20A:
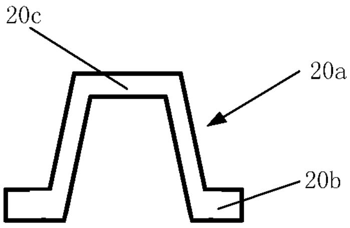
FIG. 20*a* to FIG. 20*f* are schematic diagrams illustrating a fabrication method provided in Embodiment 16 of the present disclosure, where the conductive member is formed by stamping a sheet metal.
Figure 20B:
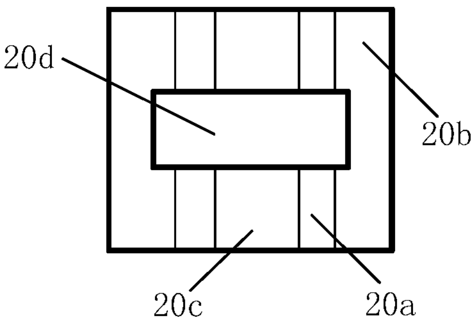

Specifically, first, the sheet metal is stamped, so that the profile of the stamped sheet metal has a shape as shown in FIG. 20*a*. Then, a hole 20*d* is formed on the top surface of the stamped sheet metal to form four vertical pillars 20*a*. FIG. 20*b* is a top view, as can be seen from FIG. 20*b*, the adjacent two pillars 20*a* are connected to each other through the connected part, i.e., the short connection piece 20*c*.

Figure 20C:
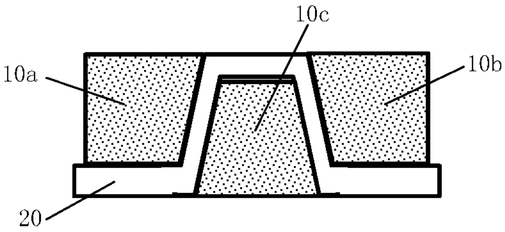
Figure 20D:
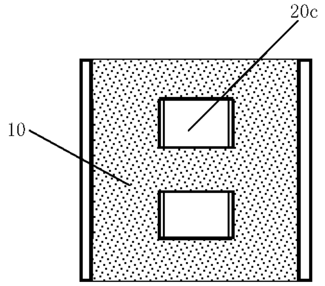

Then, the magnetic material is injected onto the conductive member 20. For example, the magnetic cores 10*a,* 10*b* and 10*c* can be injected onto the conductive member 20 as shown in FIG. 20*c*. In some examples, the magnetic cores 10*a* and 10*b* may be integrated together, that is, the magnetic cores 10*a* and 10*b* are integrally pre-formed into a magnetic core structural member. The materials of the magnetic cores 10*a,* 10*b,* and 10*c* may be the same or different. For example, materials having different relative magnetic permeabilities may be used, respectively. The magnetic cores 10*a,* 10*b,* and 10*c* are assembled with the conductive member 20 and then placed in an injection molding tooling to receive injection, so that the magnetic cores 10*a,* 10*b,* 10*c* and the conductive member 20 are integrated together. FIG. 20*d* is a top view of FIG. 20*c*, and FIG. 20*e* is a bottom view of FIG. 20*c*.

It should be understood that, in some examples, the magnetic core 10*c* may not be used. Instead, it may be possible to fill in the magnetic powder after the magnetic cores 10*a* and 10*b* have been assembled with the conductive member 20 and then placed in the injection molding tooling. In other words, the magnetic cores 10*a* and 10*b* may be pre-pressed from the first magnetic powder 62 (or the second magnetic powder 61) described above. Then, the magnetic cores 10*a* and 10*b* are assembled with the conductive member 20 and placed in the injection molding tooling. Next, as shown in FIG. 20*c*, the position corresponding to the magnetic core 10*c* in the mold is filled with the second magnetic powder 61 (or the first magnetic powder 62). Then, the magnetic cores 10*a* and 10*b,* the conductive member 20 and the second magnetic powder 61 (or the first magnetic powder 62) are injected. Alternatively, instead of using the magnetic cores 10*a* and 10*b,* it may be possible to fill in the magnetic powder after the magnetic core 10*c* has been assembled with the conductive member 20 and placed in the injection molding tooling. In other words, the magnetic core 10*c* may be pre-pressed from the first magnetic powder 62 (or the second magnetic powder 61). Then, the magnetic core 10*c* is assembled with the conductive member 20 and placed in the injection mold. Next, as shown in FIG. 20*c*, the position corresponding to the second magnetic powder 61 (or the first magnetic powder 62) is filled with the second magnetic powder 61 (or the first magnetic powder 62). Then, the magnetic core 10c, the conductive member 20 and the second magnetic powder 61 (or the first magnetic powder 62) are injected. Similarly, heating may be applied during the injection in the present embodiment.

Figure 20E:
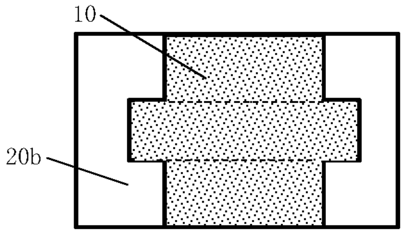
Figure 20F:
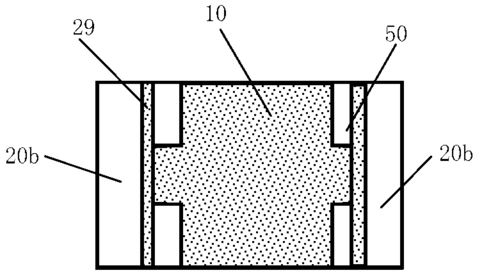

Finally, as shown in FIG. 20*f,* on the basis of FIG. 20*e*, a separation groove 29 is formed on the connection piece 20*b,* and the four pads 50 exposed at the bottom in FIG. 20*f* can serve as lead pins. Certainly, in some examples, the portion corresponding to 20*b* in FIG. 20*f* can also be removed.

Embodiment 17

The difference between the present embodiment and Embodiment 15 or Embodiment 16 is that the pillars, which are stamped from sheet metal, on the conductive member 20 are not short-circuited to each other through the short connection piece 20*c*.

Figure 21A:
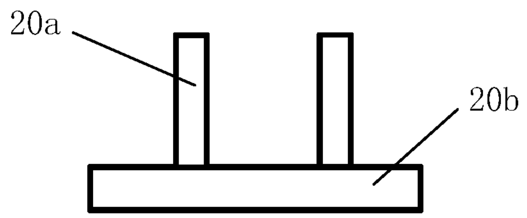
FIG. 21*a* to FIG. 21*f* are schematic diagrams illustrating a fabrication method provided in Embodiment 17 of the present disclosure, where the conductive member is formed by stamping a sheet metal.
Figure 21B:
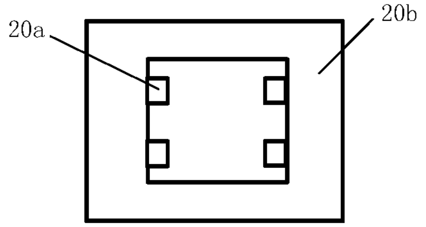

Specifically, the sheet metal is firstly stamped, so that the sheet metal having been stamped has a profile shaped as shown in FIG. 21*a*, and a top surface shaped as shown in FIG. 21*b*. As can be seen from the top view shown in FIG. 21*b*, the sheet metal has an opening in the middle after being stamped, and the four pillars 20*a* are disposed around the opening. The opening in the middle may provide the pillar 20*a* with a sheet metal material. Certainly, instead of the middle opening, an opening may also be formed on the periphery of the connection piece 20*a* to provide the pillar 20*a* with the sheet metal material. Since there is no short-connection piece 20*c* for connecting the pillars 20*a,* an advantage has been achieved in allowing the magnetic material to flow in a direction from the pillar 20*a* toward the connection piece 20*b* during the injection process.

Figure 21C:
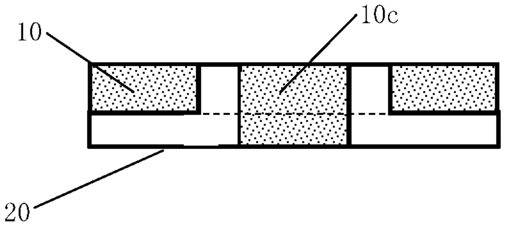
Figure 21D:
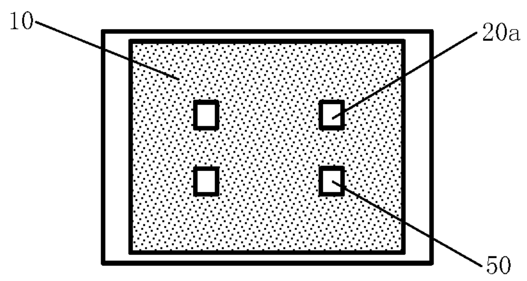

As shown in FIG. 21*c*, which is a side view, the conductive member 20 is placed in a mold, and then the magnetic powder is filled into the mold and injected with the conductive member 20, forming an integrated structure. Certainly, in some examples, the magnetic powder may be pre-pressed into a magnetic core structural member, and then the magnetic core structural member and the conductive member 20 are assembled and placed in an injection molding mold for injection, so that the magnetic core and the conductive member 20 are integrated together, and heating may also be applied during the injection process. FIG. 21*d* is a top view of FIG. 21*c*, and FIG. 21*e* is a bottom view of FIG. 21*c*.

Figure 21E:
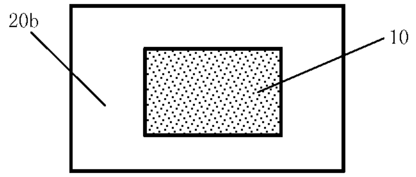
Figure 21F:
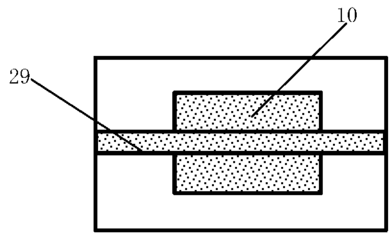

As shown in FIG. 21*f,* a separation groove 29 is formed on the connection piece 20*b* on the basis of FIG. 21*e* to form two windings. The exposed end surfaces of the four pillars 20*a* in FIG. 21*d* may form a terminal 50 for external connection.

In each of the above embodiments, the magnetic material may be a magnetic core pre-pressed into a shape matching that of the conductive member. The phrase "the magnetic core and the conductive member are put into a mold" means that the magnetic core and the conductive member are put into the mold after they are assembled, or they are separately or simultaneously put into the mold. Preferably, the magnetic core and the conductive member conduct match each other when combined together in the mold. The magnetic core and the conductive member are hot pressed, so that the magnetic core and the conductive member are integrated together. Before the hot pressing, other magnetic material, such as other magnetic powder material, may also be added. In addition, the magnetic material in the embodiments may include a variety of magnetic materials, e.g., two kinds of magnetic materials including first magnetic powder and second magnetic powder. The relative magnetic permeabilities of the first magnetic powder may be different from that of the second magnetic powder. The magnetic material is injected onto the conductive member, so that the magnetic material and the conductive member form an integrated structure. Specifically, the first magnetic powder may be pressed to form a first magnetic core with a shape matching that of the conductive member. The first magnetic core and the conductive member are placed in a mold. The second magnetic powder is filled in the mold. The first magnetic core, the second magnetic powder and the conductive member are hot pressed, so that the first magnetic core and the second magnetic powder and the conductive member form an integrated structure. Alternatively, the second magnetic powder may be injected to form a second magnetic core with a shape matching that of the conductive member. The second magnetic core and the conductive member are placed in the mold. The first magnetic powder is filled into the mold. The second magnetic core, the first magnetic powder and the conductive member are hot pressed, so that the second magnetic core, the first magnetic powder and the conductive member may form an integrated structure. Alternatively, the first magnetic powder may be pressed to form a first magnetic core, and the second magnetic powder may form a second magnetic core. The shapes of the first magnetic core and the second magnetic core match that of the conductive member. The first magnetic core, the second magnetic core and the conductive member are placed in the mold. The first magnetic core, the second magnetic core and the conductive member are hot pressed, so that the first magnetic core, the second magnetic core and the conductive member may form an integrated structure. The magnetic core may be injected onto the conductive member from the pillar side, or the magnetic core may be disposed on the side opposite to the pillar side on the conductive member, and then the magnetic powder material is injected onto the pillar side.

In view of the above, in order to form an inductor with a vertical winding, it is generally necessary to firstly provide a conductive member 20 including a connection piece and a pillar, where the pillar is vertically disposed on one of the surfaces of the connection piece. Then, the magnetic material is injected onto the conductive member 20 from the pillar side (the magnetic material may be a magnetic core structural member which is pre-pressed, or may be magnetic powder filled into an injection molding tooling), so that the magnetic material and the conductive member may form an integrated structure. Finally, the connection piece is cut to form a preset winding, so as to form a magnetic element. In some cases, the conductive member 20 can be fabricated by etching, soldering, electroplating, engraving, or stamping and such. In addition, for a multi-phase coupled magnetic element, the cross or uncross vertical winding can be obtained depending on the manner and the position of cutting the connection piece.

It should be understood that the terms "upper", "lower", "front", "back", "left", "right", "vertical", "horizontal", "top", "bottom", "inside", "outside" and such indicate the orientation and position relationship based on the orientation or positional relationship shown in the appended drawings, and are merely for the convenience of describing the disclosure and for the simplification of description, rather than indicating or implying that the device or element referred to must have any particular orientation and be constructed and operated when in any particular orientation. Therefore, they cannot be understood as limitations on the disclosure.

Moreover, the terms "first" and "second" are used for descriptive purposes only and are not to be construed as indicating or implying a relative importance or implicitly indicating the number of technical features indicated. Thus, features defined with "first" or "second" may include at least one of the features, either explicitly or implicitly. In the description of the present disclosure, the term "a plurality of" means at least two, e.g., two, three, etc., unless specifically defined otherwise.

Finally, it should be noted that the above embodiments are only used to illustrate the technical solutions of the present disclosure, and are not to be taken in a limiting sense. Although the present disclosure has been described in detail with reference to the embodiments described above, those of ordinary skill in the art should understand that the technical solutions described in the above embodiments may be modified, or some or all of the technical features may be replaced by their equivalents; and the modifications or substitutions do not cause the essence of the corresponding technical solutions to deviate from the scope of the technical solutions of the embodiments of the present disclosure.

What is claimed is:

1. A fabrication method for an inductor with a vertical winding, comprising:
- providing a conductive member that comprises a connection piece and a pillar, the connection piece comprising a first surface and a second surface that are oppositely arranged, and the pillar being disposed on the first surface;
- injecting a magnetic material onto the conductive member, such that the magnetic material and the conductive member form an integrated structure; and
- cutting the connection piece into multiple parts, wherein at least one part of the multiple parts and a corresponding pillar thereof form the vertical winding;
- wherein the cutting the connection piece into multiple parts comprises:
- removing a portion of the connection piece by cutting a channel with a depth in the connection piece to form a separation groove, while leaving all remaining portions of the connection piece horizontally corresponding in depth to the separation groove;
- wherein an upper surface of the pillar is exposed from the magnetic material at a surface of the integrated structure.

2. The fabrication method according to claim 1, wherein the magnetic material is injected onto the conductive member from the pillar, such that the magnetic material and the conductive member form an integrated structure.

3. The fabrication method according to claim 1, wherein a through hole is formed on the connection piece.

4. The fabrication method according to claim 1, wherein there are a plurality of pillars which are arranged as a matrix on the connection piece.

5. The fabrication method according to claim 4, wherein the plurality of pillars comprise four pillars, and one of the portions of the connection piece remaining after the formation of the separation groove short-circuits two of the four pillars, and another of the portions of the connection piece remaining after the formation of the separation groove short-circuits the other two of the four pillars, so as to form crossed windings or non-crossed windings.

6. The fabrication method according to claim 4, wherein the plurality of pillars comprise four pillars, and the cutting the connection piece to form the vertical winding specifically comprises:

forming a cutting groove on the connection piece to short-circuit two diagonally symmetrical pillars of the four pillars, and to electrically isolate the two diagonally symmetrical pillars from other two pillars of the four pillars; and disposing a connection winding on the other two pillars to form crossed windings.

7. The fabrication method according to claim 1, wherein the magnetic material surrounds a periphery of the connection piece.

8. The fabrication method according to claim 1, wherein the pillar comprises:

a reinforcement inner core and a conductive layer coated over the reinforcement inner core.

9. The fabrication method according to claim 8, wherein the pillar further comprises an insulation layer coated over the conductive layer.

10. The fabrication method according to claim 1, further comprising:

stacking a metallized wiring layer on the conductive member onto which the magnetic material has been injected, and forming a conductive via for connecting the pillar and the metallized wiring layer.

11. The fabrication method according to claim 1, further comprising:

bonding, by an adhesive, a reinforcement part on a surface of the connection piece facing away from the pillar.

12. The fabrication method according to claim 1, wherein the injecting a magnetic material onto the conductive member, such that the magnetic material and the conductive member form an integrated structure comprises:

the magnetic material being a magnetic core pre-pressed, the magnetic core having a shape matching the shape of the conductive member;

putting the magnetic core and the conductive member into a mold; and hot pressing the magnetic core and the conductive member, such that the magnetic core and the conductive member form an integrated structure.

13. The fabrication method according to claim 1, wherein the magnetic material comprises first magnetic powder and second magnetic powder, there are a plurality of pillars, and the second magnetic powder is located between at least two adjacent pillars and is surrounded by the first magnetic powder.

14. The fabrication method according to claim 1, wherein the magnetic material comprises first magnetic powder and second magnetic powder, wherein the second magnetic powder has a relative magnetic permeability less than that of the first magnetic powder or the second magnetic powder has a relative magnetic permeability greater than or equal to 0.99 and less than or equal to 1.01.

15. The fabrication method according to claim 14, wherein the injecting a magnetic material onto the conductive member, such that the magnetic material and the conductive member form an integrated structure comprises:

pressing the first magnetic powder to form a first magnetic core having a shape matching a shape of the conductive member;

loading the first magnetic core and the conductive member into a mold;

filling the mold with the second magnetic powder; and hot pressing the first magnetic core, the second magnetic powder and the conductive member, such that the first magnetic powder, the second magnetic powder and the conductive member form an integrated structure.

16. The fabrication method according to claim 14, wherein the injecting a magnetic material onto the conductive member, such that the magnetic material and the conductive member form an integrated structure comprises:

pressing the second magnetic powder to form a second magnetic core having a shape matching a shape of the conductive member;

putting the second magnetic core and the conductive member into a mold;

filling the mold with the first magnetic powder; and hot pressing the second magnetic core, the first magnetic powder and the conductive member, such that the second magnetic powder, the first magnetic powder and the conductive member form an integrated structure.

17. The fabrication method according to claim 14, wherein the injecting a magnetic material onto the conductive member, such that the magnetic material and the conductive member form an integrated structure comprises:

pressing the first magnetic powder to form a first magnetic core, forming the second magnetic powder into a second magnetic core, a shape of the first magnetic core and a shape of the second magnetic both matching a shape of the conductive member;

putting the first magnetic core, the second magnetic core and the conductive member into a mold; and hot pressing the first magnetic core, the second magnetic core and the conductive member, such that the magnetic material, the second magnetic material and the conductive member form an integrated structure.

* * * * *